United States Patent [19]

Beard et al.

[11] Patent Number: 5,464,051

[45] Date of Patent: Nov. 7, 1995

[54] RADIAL PLY TIRE WITH SPECIFIED BEAD PORTION DESIGN

[75] Inventors: Richard C. Beard, Massillon; Michael D. Kachner, Akron, both of Ohio

[73] Assignee: The Goodyear Tire & Rubber Company, Akron, Ohio

[21] Appl. No.: 148,783

[22] Filed: Nov. 5, 1993

[51] Int. Cl.⁶ .................. B60C 15/02; B60C 15/024; B60C 15/04
[52] U.S. Cl. .................. 152/454; 152/539; 152/540; 152/544; 152/381.4
[58] Field of Search ................... 152/454, 535, 152/540, 544, 378 R, 375, 379.3, 379.4, 381.3, 381.4

[56] References Cited

U.S. PATENT DOCUMENTS

| | | | |
|---|---|---|---|
| 3,237,672 | 3/1966 | McMannis | 152/454 |
| 3,910,336 | 10/1975 | Boileau . | |
| 3,961,657 | 6/1976 | Chrobak | 152/454 |
| 4,077,455 | 3/1978 | Curtiss, Jr. et al. | 152/544 |
| 4,192,368 | 3/1980 | Maioccho | 152/544 |
| 4,580,610 | 4/1986 | Jackson | 152/539 |
| 4,998,575 | 3/1991 | Kanamuru | 152/544 |
| 5,117,886 | 6/1992 | Tokutake | 152/454 |
| 5,121,781 | 6/1992 | Ueyoko et al. . | |
| 5,125,445 | 6/1992 | Watanabe . | |
| 5,297,606 | 3/1994 | Pompier et al. | 152/544 |
| 5,318,088 | 6/1994 | Billieres | 152/379.3 |
| 5,333,661 | 8/1994 | Victor | 152/379.3 |

FOREIGN PATENT DOCUMENTS

| | | |
|---|---|---|
| 0129675 | 1/1985 | European Pat. Off. . |
| 0498214 | 8/1992 | European Pat. Off. . |
| 0543639 | 5/1993 | European Pat. Off. . |
| 0560560 | 9/1993 | European Pat. Off. . |
| 1127632 | 12/1956 | France . |
| 1158208 | 6/1958 | France . |
| 1195309 | 11/1959 | France . |
| 1536469 | 7/1968 | France . |
| 2366940 | 5/1978 | France . |
| 2415016 | 8/1979 | France . |
| 52-77302 | 6/1977 | Japan . |
| 57-151406 | 9/1982 | Japan . |
| 59-124415 | 7/1984 | Japan ......................... 152/379.4 |
| 0068409 | 3/1988 | Japan ......................... 152/539 |
| 26206A | 6/1988 | Japan . |
| 0297310 | 11/1989 | Japan . |
| 4126605 | 4/1992 | Japan . |
| 9201578 | 2/1992 | WIPO . |
| 9413498 | 6/1994 | WIPO . |

OTHER PUBLICATIONS

International Polymer Science and Technology, Rubber and Plastics Research Association, vol. 3, No. 1, 1976, Shrewsbury (GB), pp. 73–74, "Design Aspects of the Bead Zone of Radial-Plytractortyres".

Patent Abstracts of Japan, vol. 17, No. 397 (M–1452) 26 Jul. 1993 & JP-A-05 077 615 (Sumitomo Rubber Ind Ltd) 30 Mar. 1993.

*Primary Examiner*—Adrienne C. Johnstone
*Attorney, Agent, or Firm*—David L. King

[57] ABSTRACT

An improved radial ply pneumatic tire 30 is described. The improved tire 30 has a first annular surface 23 located between the heel 22B and toe 22A of each bead 33 and a second surface 24 extending radially outwardly from the bead heel 22B. The first surface 23 is designed to be in contact with the bead seat 42 of the design rim 40 when the tire 30 is mounted and inflated to normal pressure. The first annular surface 23, when the tire 30 is unmounted, forms an average angle β with the axis of the tire, when the beads 33 are axially spaced a distance D equal to the design rim width as defined herein. The average angle β is in the range of at least one-half degree and less than three degrees greater than the angle formed between the mating bead seat 42 of the design rim 40 and the axis of the tire. The second surface 24 is designed to be in contact with an annular flange 44 portion of the design rim 40 when the tire is mounted and inflated to normal pressure. The second surface 24 is perpendicular to the axis of rotation.

13 Claims, 17 Drawing Sheets

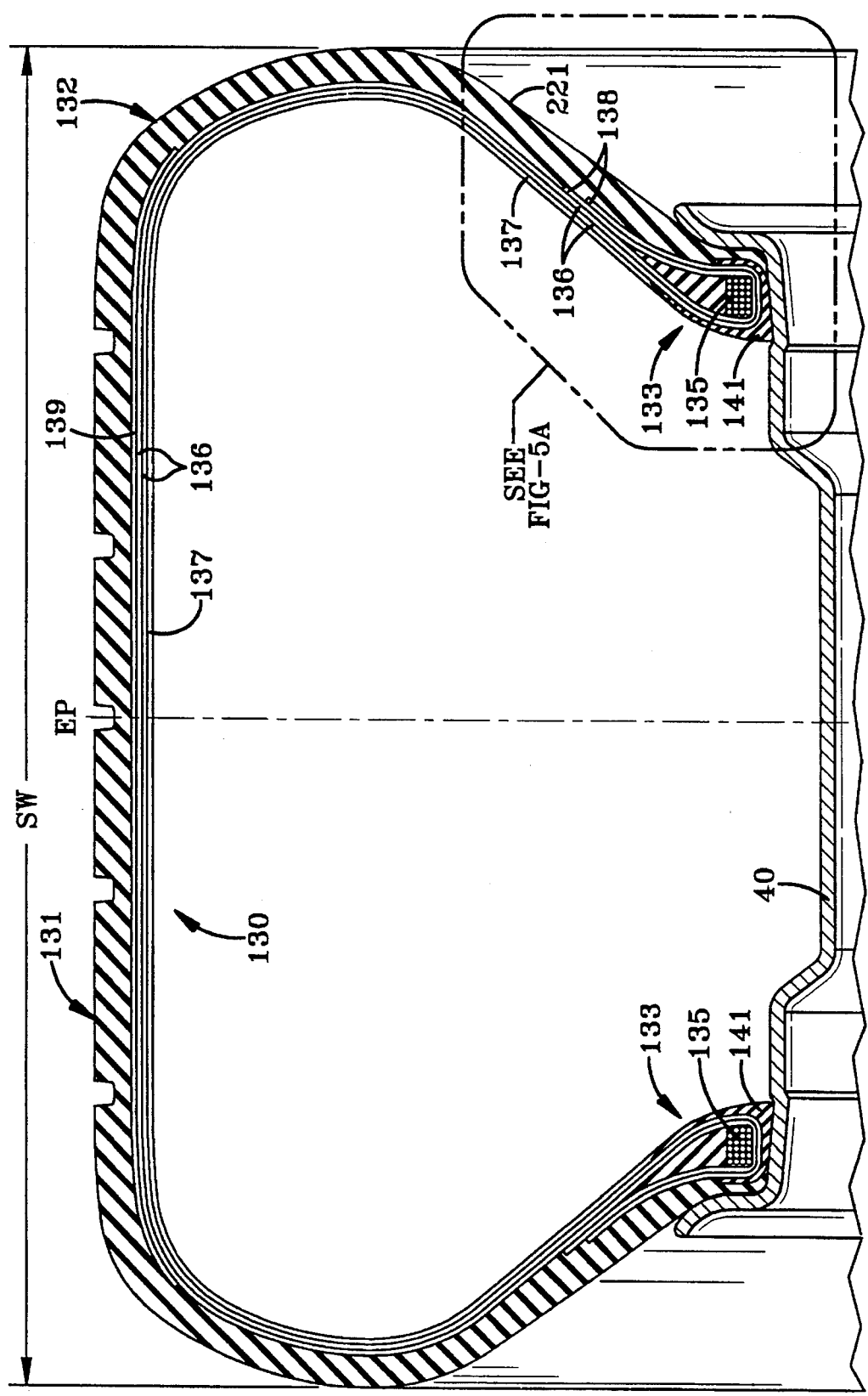

TANGENTIAL X-RAY
TIRE/RIM FITMENT
225/55R16

| FEATURE | BEAD DIA. | RIM WIDTH | GAP AVG. | GAP BETWEEN RIM AND TIRE | | | |
| --- | --- | --- | --- | --- | --- | --- | --- |
| | | | | NON SERIAL # SIDE | | SERIAL # SIDE | |
| | | | | 0° | 180° | 0° | 180° |
| CONTROL TIRE | 16.14 | 6" | 0.062 | 0.054 | 0.067 | 0.054 | 0.072 |
| 8" MOLDED BEAD WIDTH | | 7" | 0.030 | 0.026 | 0.035 | 0.026 | 0.031 |
| 15.908" SHARP DIA. AND | | 8" | 0.022 | 0.027 | 0.000 | 0.049 | 0.013 |
| STANDARD MOLD RING | | 9" | 0.015H | 0.018H | 0.000 | 0.022H | 0.018H |
| EXPERIMENTAL TIRE | 16.18 | 6" | 0.000 | 0.000 | 0.000 | 0.000 | 0.000 |
| 7.25" MOLDED BEAD WIDTH | | 7" | 0.000 | 0.000 | 0.000 | 0.000 | 0.000 |
| 15.923" SHARP DIA. AND | | 8" | 0.010H | 0.009H | 0.009H | 0.009H | 0.013H |
| NEW SHAPE MOLD RING | | 9" | 0.009H | 0.013H | 0.000 | 0.009H | 0.013H |

X.XXXH = X.XXX HEAL RADIUS

FIG-7

PRIOR-ART

| ENGINEERING CALCULATION | LEDGE WIDTH | BEAD DIA. | SHARP DIA. | BEAD HEAL A | ∠=5° B | ∠=10.5° C | ∠=10.5° D |
|---|---|---|---|---|---|---|---|
| | 0.750 | 14.14 | 13.908 | 0.280 | 0.279 | 0.320 | 0.362 |
| TIRE DIAMETER | | | | | 13.861 | 13.820 | 13.778 |
| RIM DIAMETER | | | | | 13.921 | 13.901 | 13.881 |
| DIAMETRAL INTERFERENCE (TIRE DIA.-RIM DIA.) | | | | | 0.060 | 0.081 | 0.103 |
| % MATERIAL COMPRESSION  $\bar{x}$ 25.1  DIFF.=7.0 | | | | | 21.5 | 25.3 | 28.5 |

PRIOR-ART

| ENGINEERING CALCULATION | LEDGE WIDTH | BEAD DIA. | SHARP DIA. | BEAD HEAL A | ∠=6.5° B | ∠=6.5° C | ∠=6.5° D |
|---|---|---|---|---|---|---|---|
| | 0.750 | 14.14 | 13.923 | 0.183 | 0.278 | 0.304 | 0.330 |
| TIRE DIAMETER | | | | | 13.862 | 13.836 | 13.810 |
| RIM DIAMETER | | | | | 13.921 | 13.901 | 13.881 |
| DIAMETRAL INTERFERENCE (TIRE DIA.-RIM DIA.) | | | | | 0.059 | 0.065 | 0.071 |
| % MATERIAL COMPRESSION $\bar{\Delta}$ 21.4 DIFF.=0.3 | | | | | 21.2 | 21.4 | 21.5 |

| RIM SLIP & BEAD SEAT INFLATION TEST ||| 
|---|---|---|
| TEST TIRE-225/55R16 |||
| RIM WIDTH & MOLDED BEAD WIDTH = 8.0" VEHICLE: LEXUS SC400 | | |
| DESCRIPTION: | CONTROL TIRE | EXPL. TIRE |
| BEAD DIAMETER | 16.14 | 16.18 |
| MOLDED RIM DIAMETER | 15.908 | 15.923 |
| MOLD SHAPE | STANDARD | NEW SHAPE |
| BEAD SEAT INFLATION AT MOUNTING | 39, 45 PSI | 24, 25 PSI |
| NO RIM SLIP FOR ANY CONDITION |||

FIG-11

| LAB. BEAD DURABILITY TEST ||
|---|---|
| TEST TIRE-225/55R16 VEHICLE-LEXUS SC400 ||
| CONTROL TIRE | EXPERIMENTAL TIRE MOLDED RIM SHAPE/SHARP DIA. LOWER SIDEWALL SHAPE |
| 16.14" BEAD DIA. | 16.18" BEAD DIA. |
| 8,500 F PLY ENDING SEPARATION | 20,000 F PLY ENDING SEPARATION |
| 10,000 F PLY ENDING SEPARATION | 25,000 F PLY ENDING SEPARATION |

FIG-12

SOAPED BEAD RIM SLIP TEST

TEST TIRE – 225/60R16
VEHICLE: 1993 LINCOLN MARK VIII (FN-10)
CONTROL TIRE – PRODUCTION MOLD & MOLD RINGS W/16.14 BEAD DIA.
EXP'L. TIRE – SPECIAL MOLD RING & SIDE WALL SHAPE W/16.14 BEAD DIA.

| POSITION | CONSTRUCTION | SOAP TYPE | WIDE OPEN THROTTLE SLIP | BRAKING SLIP |
|---|---|---|---|---|
| RF | CONTROL | FORD 'B' | 0.40" | 47.80" |
| RF | CONTROL | FORD 'B' | 0.40" | 0.30" |
| RF | EXPERIMENTAL | FORD 'B' | 0.30" | 0.30" |
| RF | EXPERIMENTAL | FORD 'B' | 0.00" | 0.10" |
| RR | CONTROL | FORD 'B' | 6.80" | 0.00" |
| RR | CONTROL | FORD 'B' | 63.60" | 0.00" |
| RR | EXPERIMENTAL | FORD 'B' | 0.30" | 0.00" |
| RR | EXPERIMENTAL | FORD 'B' | 3.10" | 0.00" |

FIG-13

RADIAL PLY TIRE WITH SPECIFIED BEAD PORTION DESIGN

BACKGROUND OF THE INVENTION

This invention relates to pneumatic radial ply tires and the interrelationship between the tire and its design rim.

Historically, with the introduction of the tubeless type tire, the design fitment of the bead portions of the tire to the design rim has increased in significance. This fitment insures that the tire remains air tightly sealed and securely fixed to the rim during vehicle use.

The typical rim has a bead seat and a rim flange that defines the contact zone with the tire bead. The tire bead has an annular surface between the bead heel and bead toe that upon assembly to the rim contacts the bead seat. The bead also has an annular surface radially outwardly of the bead heel, this annular surface contacts the rim flange when the tire is mounted and inflated on the rim.

The prior art teaches the use of a rim with cylindrical or very slightly conical bead seats. Typically such bead seats were inclined at an angle of 5° relative to the axis of rotation of the tire. To ensure a proper fitment, the tire beads had an annular surface having a similar 5° inclination relative to the axis of rotation, the beads having a slightly smaller diameter than the rim seat, thus upon assembly, a snug interference fit would be achieved. Such a prior art tire is shown in FIG. 3A.

As a later development, the radially innermost flexible toe portion of the tire between the toe and the annular tensile member comprised an inclined surface about 5° greater than the rim seat. This added interference created by the angular variation facilitated sealing the tire. This prior art tire is illustrated in FIGS. 3B and 3C.

The prior art tires had beads with a surface radially outwardly of the bead heel. This surface ideally should contact the rim flange, both the rim flange and this axially and radially outwardly surface being oriented at 90° relative to the wheel axis. This area being under pressure while the tire is inflated over a portion of its surface, contacts the rim flange essentially fastenings the tire on the rim.

The prior art tires essentially relied on the rim seat and flange orientation to establish the shape and orientation of the bead, with the exception being the flexible toe portion of the bead.

Surprisingly it has been discovered that the prior art tire bead designs have a less than ideal fitment to the rim, particularly in the rim flange area of the J type rims. Those skilled in the art have believed that the surface radially outward of the bead heel was in firm surface contact with the rim flange. In fact, tangential x-rays indicate that a portion of this flange surface area is actually spaced from the rim creating a gap and, therefore, is of no assistance in firmly fixing the tire to the rim.

It has been discovered that a tire made according to the present invention, having unique bead surfaces for contacting the rim can result in a tire having improved lower sidewall stiffness, better rolling resistance and improved comfort. A tire made according to the present invention can exhibit uniformly low bead seating forces when mounted to the rim, yet also exhibit superior adhesion of the tire to the rim.

SUMMARY OF THE INVENTION

An improved radial ply pneumatic tire 30 is described. The tire 30 has an axis of rotation, a pair of axially-spaced beads 33 respectively including annular tensile members 35, each annular tensile member having a radially inner flat surface prior to the tire being molded, and at least one radial ply 36 extending between the annular tensile members 35 of the respective beads 33. The beads 33 each have a heel 22B portion and a toe portion 22A designed to engage a design rim 40 having a bead seat 42 and a design rim width as specified by the industry standards in effect in the location in which the tire is manufactured.

The improved tire 30 is characterized by a first annular surface 23 between the heel 22B and toe 22A of each bead 33 and a second annular surface 24 radially outwardly from each bead heel 22B. The first annular surface 23 is in contact with the bead seat 42 of the design rim 40 when the tire 30 is mounted and inflated to normal pressure. The first annular surface 23, when the tire is unmounted, forms an average angle β with the axis of the tire, when the beads 33 are axially spaced a distance D equal to the design rim width. The design rim width (D) is defined as half of the quantity equal to the minimum recommended rim width plus the maximum recommended rim width. The average angle β is at least one-half degree or less than three degrees greater than the angle formed between the mating bead seat 42 of the design rim 40 and the axis of the tire. The second annular surface 24 is in contact with an annular flange portion 44 of the design rim 40 when the tire 30 is mounted and inflated to normal pressure. The second annular surface 24 of the unmounted tire is preferably inclined at an angle α that is in the range of 0° to less than 3° relative to a plane P, the plane P being perpendicular to the axis of rotation when the beads are axially spaced a distance D equal to the design rim width.

A portion of the first annular surface 23, when the beads are to the design rim width, is located between a plane C perpendicular to the axis of the tire and passing through the center of the annular tensile member 35, and a plane T tangent to the axially outer side of the annular tensile member 35 and perpendicular to the axis of rotation of the tire.

Preferably, the angle β is in the range of 5°30' and less than 8° relative to a line parallel to the axis of rotation. Most preferably β is about 6°30' greater than the angle formed between the bead seat 42 of the design rim 40 and a line parallel to the axis.

Ideally, the first annular surface is oriented at the angle β at least over the distance between the plane T and a plane S, the plane S being tangent to the axially inner side of the annular tensile member 35 and perpendicular to the axis of rotation of the tire.

A tire having the bead seat oriented at the angle β and employing an annular tensile member formed with a flat base when combined with a rim having a 5° bead seat area yields generally uniform compression of the material between the first annular surface and the annular tensile member as measured between an axially inner end and an axially outer end of the radially inner flat surface of the annular tensile member, the compression being measured as a percentage of radial compression when the tire is mounted to its design rim. This uniform compression enables the tire to be built requiring low and uniform bead seating forces while at the same time yielding improved adhesion of the tire to the rim.

In the preferred embodiment, the first surface is inclined at an angle β and extends axially outwardly of the plane T. The first surface 23 intersects with the heel, the heel having a single radius of curvature. The heel curvature extends axially and radially outwardly and is tangent to the second surface 24. The second surface extends radially outwardly preferably perpendicular to the axis of rotation to a third surface, the third surface being curved and having a radius of curvature at least equal to or greater than the radius of curvature of the design rim flange.

DEFINITIONS

"Aspect ratio" of the tire means the ratio of its section height (SH) to its section width (SW) multiplied by 100% for expression as a percentage.

"Axial" and "axially" means lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt structure" or "Reinforcing Belts" means at least two annular layers or plies of parallel cords, woven or unwoven, underlying the tread, unanchored to the bead, and having both left and right cord angles in the range from 17 degrees to 27 degrees with respect to the equatorial plane of the tire.

"Carcass" means the tire structure apart from the belt structure, tread, undertread, and sidewall rubber over the plies, but including the beads.

"Circumferential" means lines or directions extending along the perimeter of the surface of the annular tread perpendicular to the axial direction.

"Cord" means one of the reinforcement strands of which the plies in the tire are comprised.

"Design rim" means a rim having a specified configuration and width. For the purposes of this Specification, the design rim and design rim width are as specified by the industry standards in effect in the location in which the tire is made. For example, in the United States, the design rims are as specified by the Tire and Rim Association. In Europe, the rims are as specified in the European Tyre and Rim Technical Organisation—Standards Manual and the term design rim means the same as the standard measurement rims. In Japan, the standard organization is The Japan Automobile Tire Manufacturer's Association.

"Design rim width" means the specified distance axially between rim flanges. For the purpose of this specification, the design rim width (D) is taken as (the minimum recommended rim width plus the maximum recommended rim width)/2 as specified by the appropriate industry standards.

"Equatorial plane (EP)" means the plane perpendicular to the tire's axis of rotation and passing through the center of its tread.

"Innerliner" means the layer or layers of elastomer or other material that form the inside surface of a tubeless tire and that contain the inflating fluid within the tire.

"Normal inflation pressure" refers to the specific design inflation pressure and load assigned by the appropriate standards organization for the service condition for the tire.

"Normal load" refers to the specific design inflation pressure and load assigned by the appropriate standards organization for the service condition for the tire.

"Ply" means a continuous layer of rubber-coated parallel cords.

"Radial" and "radially" means directions radially toward or away from the axis of rotation of the tire.

"Radial-ply tire" means a belted or circumferentially-restricted pneumatic tire in which the ply cords which extend from bead to bead are laid at cord angles between 65° and 90° with respect to the equatorial plane of the tire.

"Section height" (SH) means the radial distance from the nominal rim diameter to the outer diameter of the tire at its equatorial plane.

"Section width" (SW) means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Sharp diameter" means the diameter as measured radially across the tire through the axis to the points defined by the intersection of a line extending tangent the bead seat or first surface and a line extending tangent the bead flange or second surface.

"Shoulder" means the upper portion of a sidewall just below the tread edge. Affects cornering.

"Sidewall" means that portion of a tire between the tread and the bead.

"Tread width" means the arc length of the tread surface in the axial direction, that is, in a plane passing through the axis of rotation of the tire.

BRIEF DESCRIPTION OF THE DRAWINGS

FIG. 5 is a cross sectional view of the prior art tire of FIG. 3B mounted and inflated on a design rim.

FIG. 7 is a table of the tire and rim fitment of the tires of FIGS. 5 and 6 when mounted to rims having design widths of 6, 7, 8 and 9 inches (152, 79, 203 and 229 mm).

FIG. 11 is a table demonstrating the range of bead seat inflation of the prior art tire versus the tire of the present invention.

FIG. 12 is a table demonstrating the bead durability of the prior art tire versus a tire of the present invention.

FIG. 13 is a table demonstrating the rim slip exhibited by the prior art tire versus a tire according to the present invention.

DETAILED DESCRIPTION OF THE INVENTION

Figure 1:
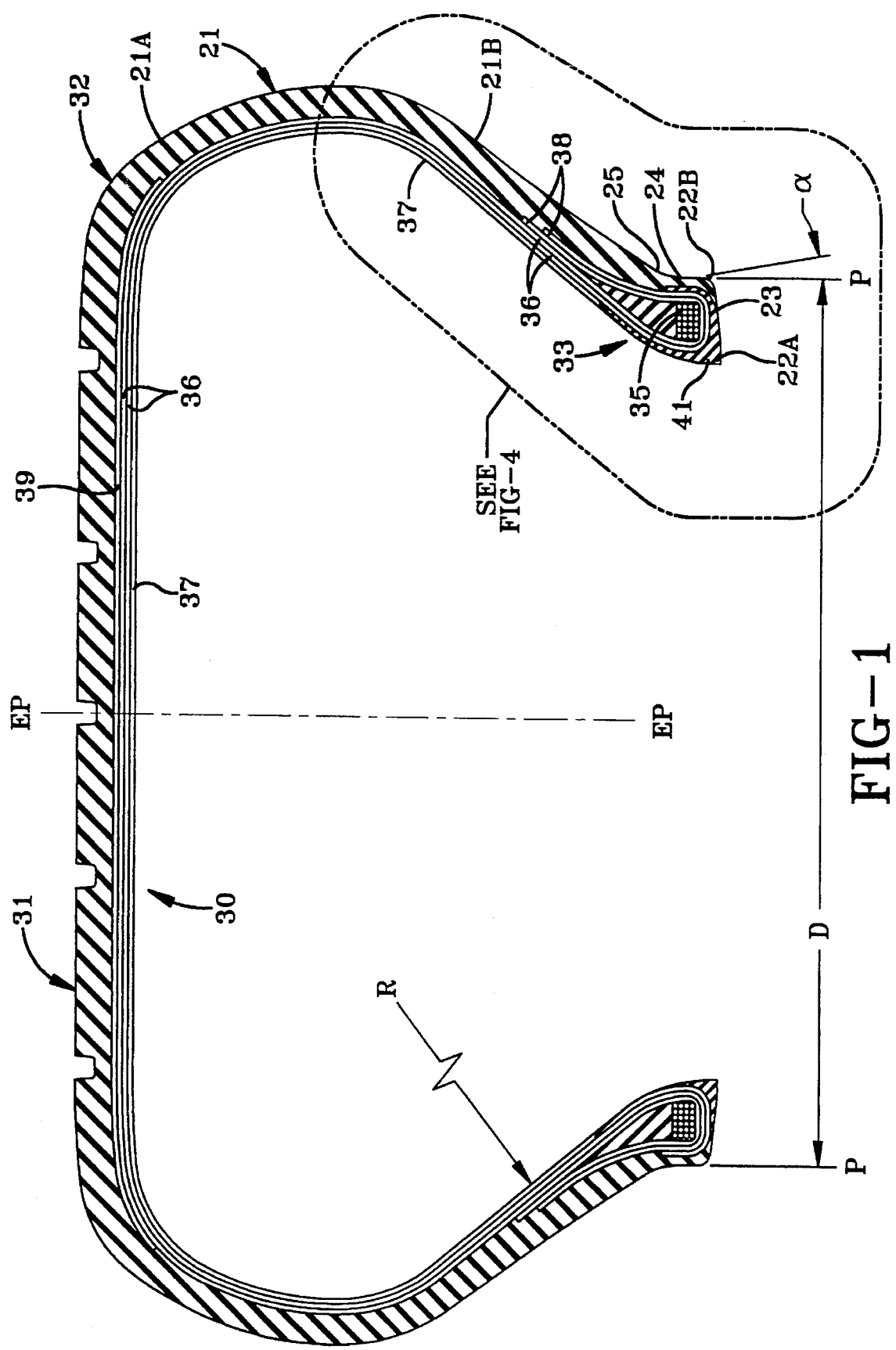
FIG. 1 is a cross-sectional view of the preferred tire made in accordance with the invention.

Referring to FIG. 1, there is illustrated a cross sectional view of a tire made in accordance with the present invention. In the particular embodiment, the tire 30 is a low aspect ratio passenger tire. As shown, the beads 33 are spaced axially a distance (D) equal to the specified design rim width.

The tire 30 is provided with a ground-engaging tread portion 31 which terminates in the shoulder portions 32 at the lateral edges of the tread. Radially outer sidewall portion 21 extends from shoulder portion 32 and terminates in the bead portion 33, the bead portion having an annular inextensible annular tensile member 35. The tire 30 is further provided with a carcass reinforcing structure 36 which extends from the tensile member 35 through the sidewall portion 21, the tread portion 31, the opposite sidewall portion 21 down to the opposite tensile member 35. The turnup ends 38 of the carcass reinforcing structure 36 are wrapped about the tensile members 35. As illustrated, the bead portion 33 has a chipper 41 wrapped about the reinforcing member 36 and tensile member 35. The tire 30 may include a conventional innerliner 37 forming the inner peripheral surface of the tire 30 if the tire is to be of the tubeless type.

Placed circumferentially about the radially outer surface of the carcass reinforcing structure 36, beneath the tread portion 31, is a tread reinforcing belt structure 39. In a preferred embodiment, the belt structure 39 comprises two single cut belt plies and the cords of the belt plies are oriented at an angle ranging between 17° and 25° with respect to the equatorial plane of the tire. The cords of one belt ply are disposed in an opposite direction to the equatorial plane and from that of the cords of the other belt ply. However, the belt structure 39 may comprise any number of belt plies of any desired configuration and the cords may be disposed at any desired angle.

The carcass reinforcing structure 36 includes at least one reinforcing ply structure comprising each one layer of parallel cords. The cords of the reinforcing ply structure 36 are oriented at an angle of at least 75° with respect to the equatorial plane EP of the tire 30. The cords reinforcing the carcass ply may be of any material normally used for cord reinforcement of rubber articles, for example, and not by way of limitation, rayon, nylon and polyester. The reinforcing ply structure 36 has its turnup ends 38, which wrap about the bead core 35, located at about 20% to 50% of the section height of the tire.

Before mounting the tire 30 on a rim and inflating it, it has the shape imparted to it by the mold. After mounting the tire 30 on the rim, the inclination of the bead portions of the tire is imposed by the rim.

The bead 33 has a first annular surface 23 located between the bead toe 22A and the bead heel 22B. The first annular surface is inclined at an angle $\beta_B$ when the beads 33 are spaced a distance D. The distance D is defined as the design rim width D or the molded bead width D. For the purpose of this specification, the design rim width (D) is the average of the specified maximum and minimum design rim widths, the widths being measured axially between the rim flanges.

The range of design rim widths is established by the industry standards applicable where the tire is made. In the United States, for example, the Tire and Rim Association standards have established a range of recommended rim widths for "J" type rims in the 14" to 16" rim diameter size, the range of widths for a 225/55R16 tire being 6.5 to 8.0 inches. The design rim width as defined in the application, therefore, is 7.25 inches for the 225/55R16 tire. A tire molded at a different bead width naturally may have different bead surface orientations. However, when the beads are spaced a distance D as so defined, the orientation of the surfaces must fall within the range to achieve the benefits of the present invention.

The bead portion 33 has a second annular surface 24 that extends radially outwardly from the bead heel portion 22B. The second surface 24 is oriented preferably perpendicular to the axis of rotation when the beads 33 are spaced at the design rim width D. Extending from the second surface 24 is a curved third surface 25. The third surface 25 tangentially extending from the second surface 24, preferably has a single radius of curvature R1. The curvature R1 is at least equal to or larger than the curvature of the design rim—s flange. The curvature R1 is preferably centered radially about 0.375 inches above the nominal diameter of the tire for a 14" or 16" "J" type rim. This positioning locates the third surface radially tangent or outward of the rim flange when the tire is mounted onto the design rim and inflated to normal pressure.

In the preferred embodiment, the lower sidewall portion 121B has a radius of curvature that is tangent to, and extends radially outward from, the third surface 25.

Figure 2:
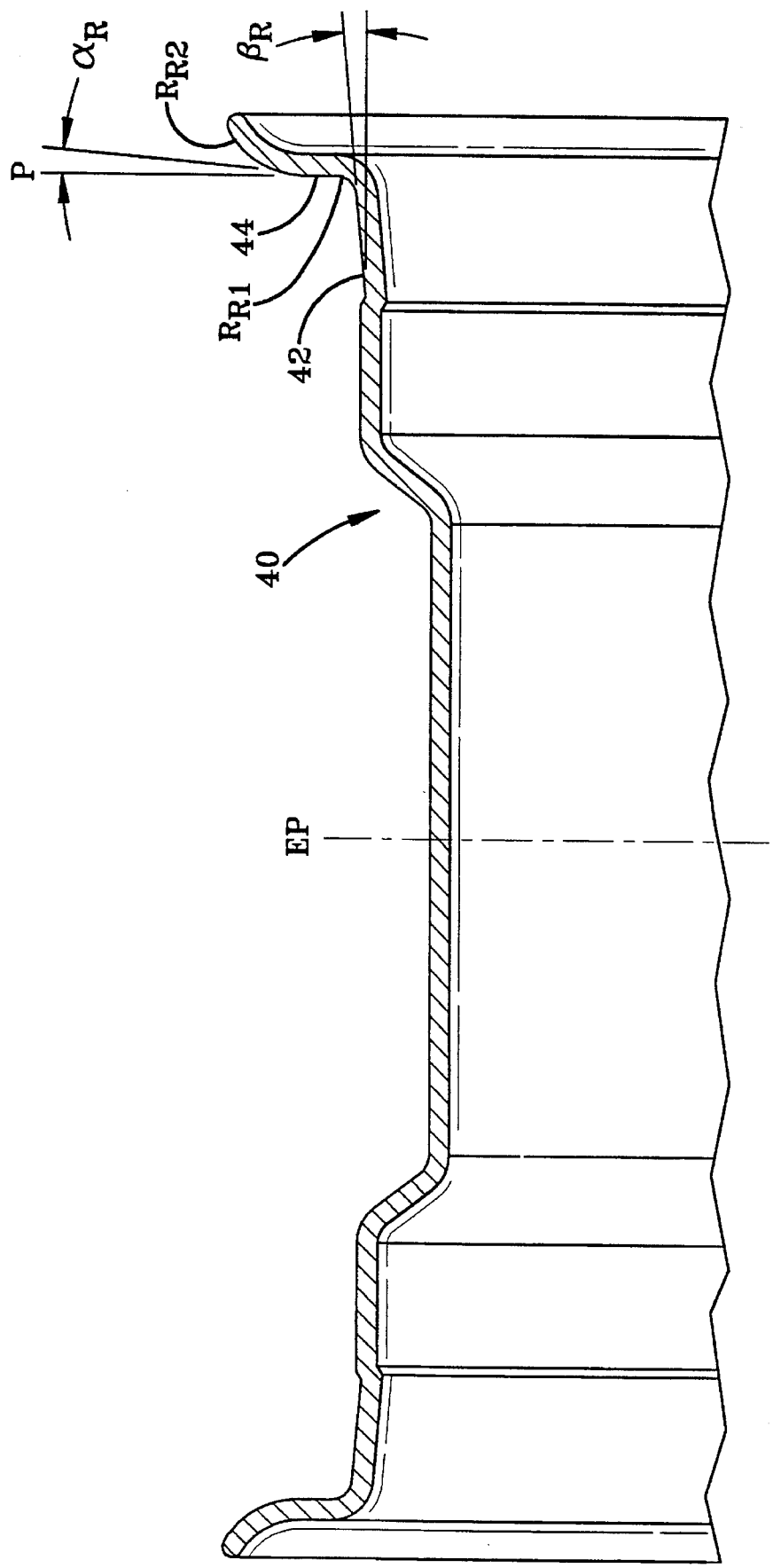
FIG. 2 is a cross sectional view of a standard design rim.

In FIG. 2, a design rim 40 is shown. The design rim has a bead seat 42 inclined at an angle $\beta_R$ relative to the axis of rotation and a flange 44 oriented at an angle $\alpha_R$, $\alpha_R$, being nominally perpendicular to the axis of rotation. The angle $\beta_R$ is nominally 5° as shown. Between the flange 44 and the bead seat 42, the rim has a radius of curvature $R_{R1}$. At the radially outer portion of the rim flange 44, the surface of the flange has a radius of curvature $R_{R2}$.

Figure 3A:
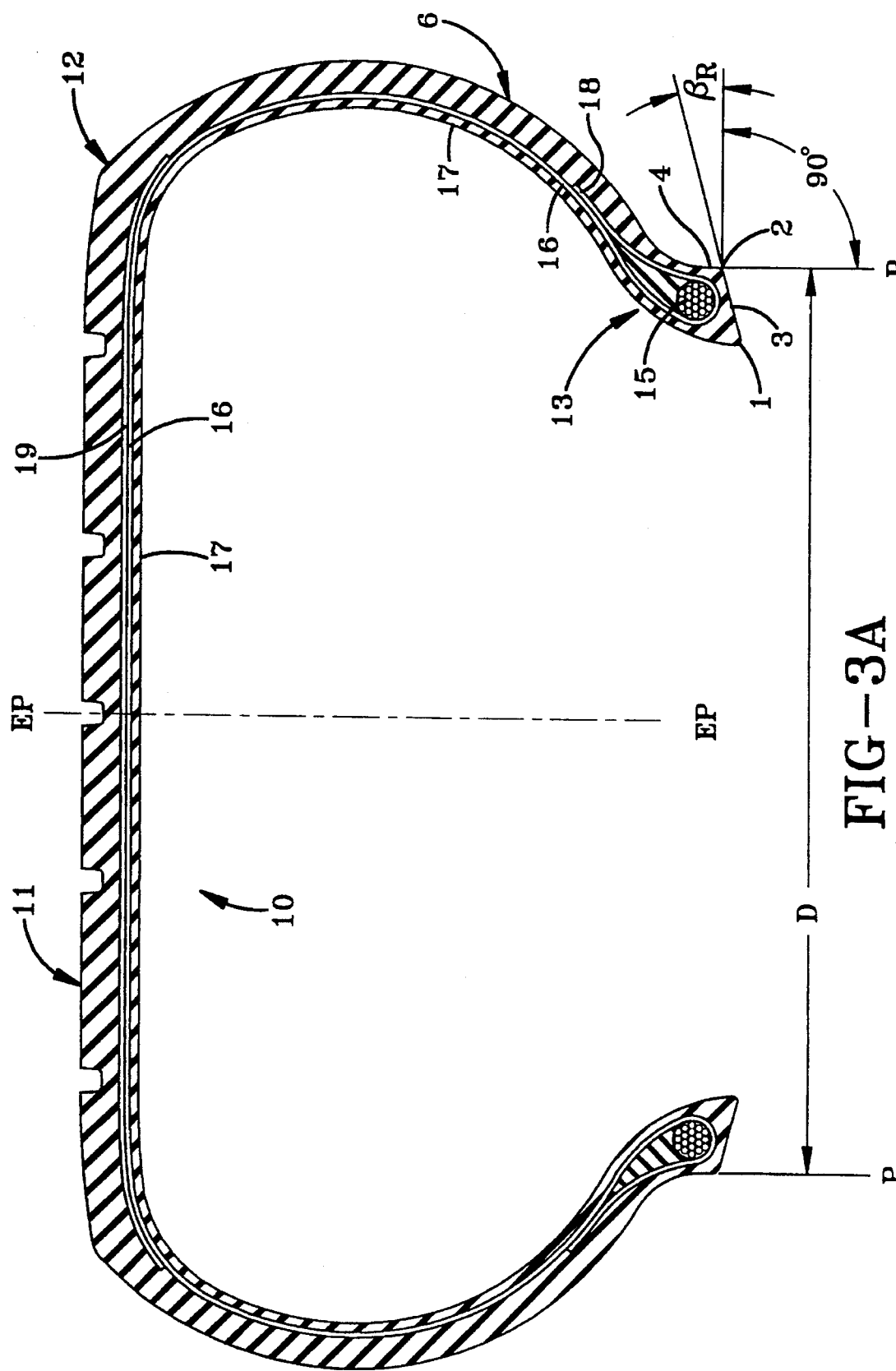
FIG. 3A is a cross sectional view of a first prior art tire.

FIG. 3A illustrates a conventional prior art tire 10 having a pair of beads 13 with each bead having an annular tensile member 15, a reinforcing ply 16 wrapped about and extending from each of the tensile members 15, a radially outer tread 11, belt reinforcement 19 and a pair of sidewalls 6 extending from the tread 11 to the beads 13. As illustrated, the beads 13 when spaced to the design rim width D have an annular surface 3 extending between the bead heel 2 and toe 1, the annular surface 3 being oriented at an angle $\beta_R$ of about 5° or identical to the rim bead seat 42 orientation. Additionally, the prior art tire as illustrated has a radially outwardly extending surface 4, the surface 4 extending from the bead heel 2 and being oriented 90° to the axis of rotation.

Figure 3B:
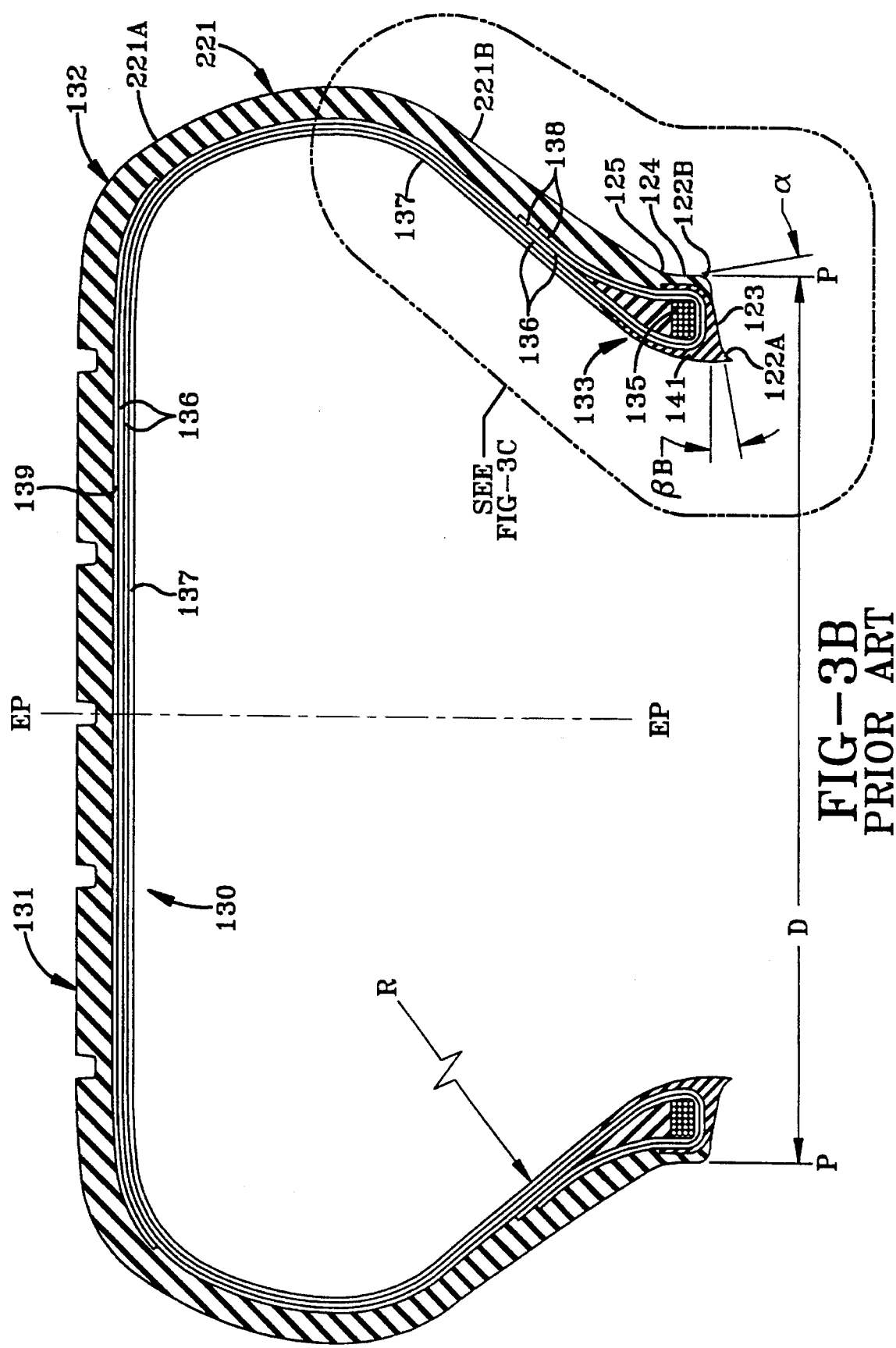
FIG. 3B is a cross sectional view of a second prior art tire.
Figure 3C:
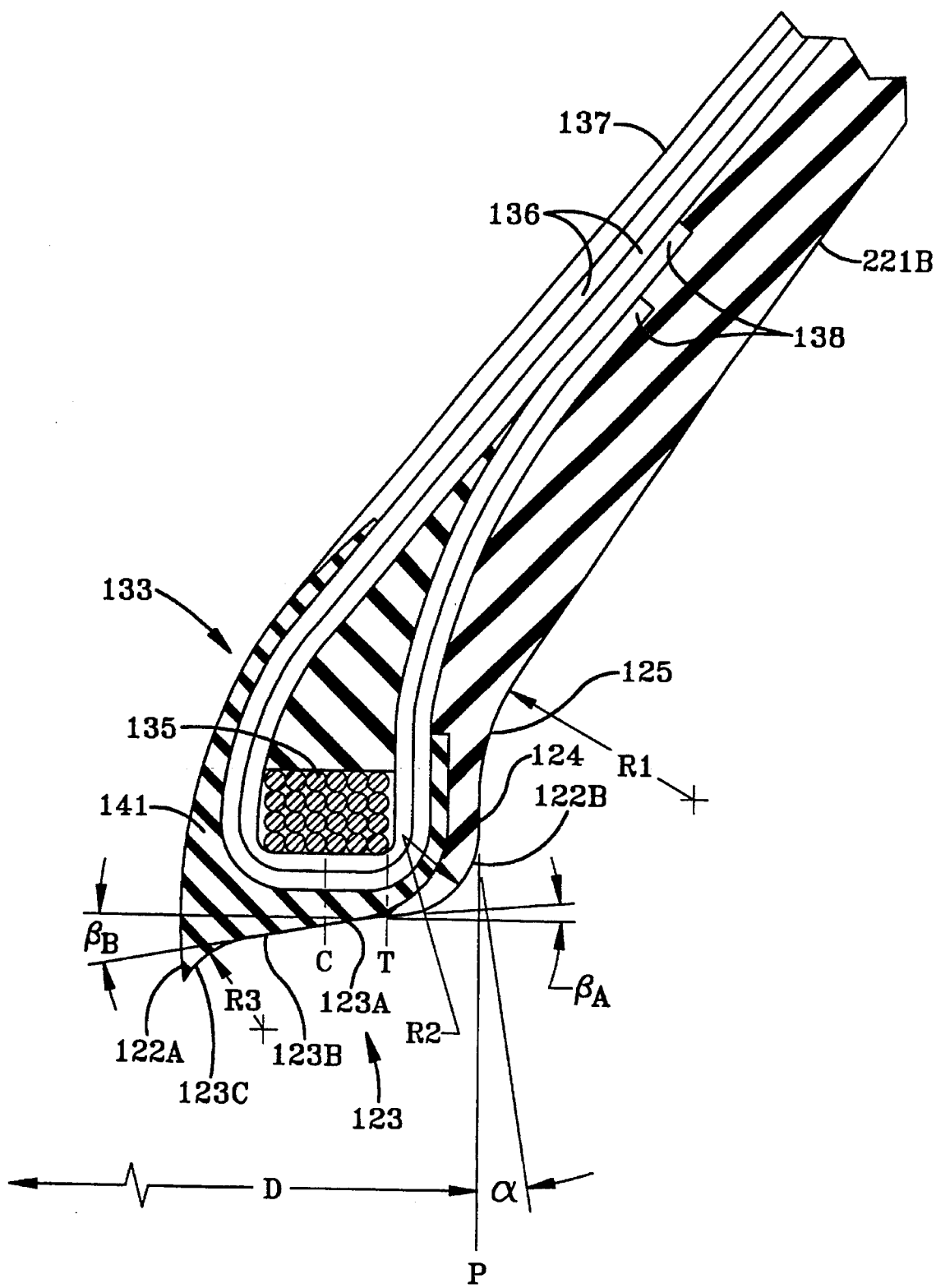
FIG. 3C is an enlarged cross sectional view of a bead taken along lines 3C of FIG. 3B.

FIG. 3B illustrates a second prior art tire 130 having a pair of beads 133, each bead having an annular tensile member 135, a reinforcing ply 136 wrapped about and extending from each of the tensile members 135, a radially outer tread 131, belt reinforcement 139 and a pair of sidewalls extending from the tread 131 to the beads 133. As illustrated in FIG. 3C, the beads 133, when spaced to the design rim width D, have a first annular surface 123 extending between the bead heel 122B and toe 122A. The first annular surface 123 has a first portion 123A extending from the bead heel 122B to a point C about axially aligned with the axial center of the bead 135, the first portion 123A being oriented at 5° relative to the axis of rotation. The first surface 123 further has a second portion 123B extending from the first portion 123A, the second portion 123B being inclined at an angle of 10.5° relative to the axis. The second portion 123B extends axially inwardly to a curved third portion 123C, the third portion 123C being adjacent the toe and having a radius of curvature of $R_3$. The three portions of the first surface 123 and the radially inner surface of the heel 122B comprise the bead seat surfaces. The bead portion 133 of the prior art tire 130 further includes a radially outwardly extending second surface 124, the second surface 124 extending from the bead heel 122B and oriented perpendicular to the axis of the tire 130. A curved third surface 125 extends from the second surface 124 to the lower sidewall portion 221B. The third surface has a single radius of curvature R1. The tire 130 having a compound first surface 123 with increased inclination between the toe 122B and the first portion 123A was designed to enhance air tight sealing and adhesion of the tire 130 to the rim 40. The increase in angular inclination, particularly directly radially inward of the bead tensile member, meant that the percent of compression of material between the bead 133 and the rim 40 varied greatly upon assembly. This variation of compressed material in combination with the normal tolerances involved in the manufacturing process results in a wide range of bead seating force and is a contributor to tire fit nonuniformity.

Figure 4:
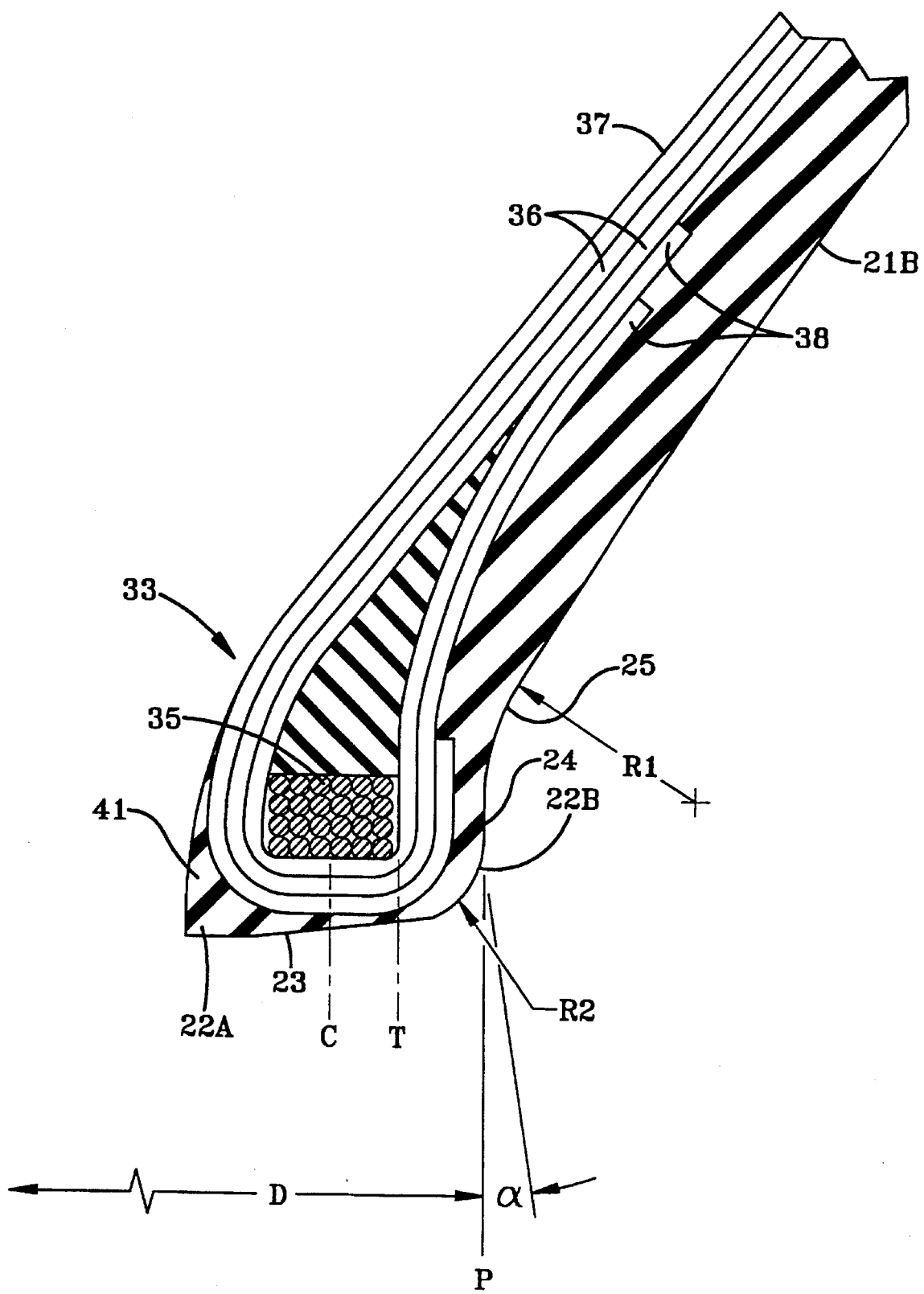
FIG. 4 is an enlarged cross sectional view of a bead taken along lines 4—4 of FIG. 1.

As shown in FIG. 4, an enlarged bead portion 33 made according to the present invention is positioned at the axially spaced distance equal to the design rim width D. Between the axially outer bead heel 22B and the axially inner bead toe 22A is a first annular surface 23. The first annular surface 23 is inclined at an angle $\beta$ relative to a line parallel to the axis of rotation of the tire 30. The angle $\beta$ is preferably in the range of 5°30' to less than 8°, more preferably between 6° and 7°. When mounted to the rim 40 having a $\beta_R$ inclination of 5°, the angular variation between $\beta$ and $\beta_R$ is 0°30' to less than 3°, preferably about 1.5° angular variation.

In addition to this angular variation, the tire 30 according to the present invention has a second annular surface 24 radially outwardly of the bead heel 22B. The second annular surface 24 is in contact with the annular flange portion 44 of the design rim 40 when the tire 30 is mounted and inflated to normal pressure. The second annular surface 24 is preferably oriented at an angle $\alpha$, $\alpha$ being perpendicular to the axis of rotation. Alternatively, $\alpha$ can be substantially equal to the angular difference of the first annular surface $\beta$ minus the bead seat orientation of the rim $\beta_r$. This means that $\alpha$ can be inclined in the range of 0° to less than 3° from the perpendicular plane P, preferably 0° to 1.5° off perpendicular.

In order to precisely measure the bead surfaces, it is recommended that the unmounted and uninflated tire 30 have its beads 33 positioned at the specified design rim width of the tire. Next two reference points on the bead must be established the two points being in the same cross sectional plane. The first point is suggested to be at the bead toe 22A and the second point anywhere along the second annular surface. By measuring from a fixed distance from the axis of rotation of the tire, a reference line can be established parallel to the axis of rotation. The tire bead being reasonably dimensionally stable can be cut from the tire in cross sections such that the two marked reference points are in the same plane. By reestablishing the reference line, the same orientation of the annular tire with its bead located at the design rim width is achieved when the two reference points are positioned the exact radial distance above the reference line. It should be noted the reference line may be at the axis of rotation or any convenient line parallel to the axis and lying in a plane between the axis and the two reference points.

Once the dimensional reference is reestablished, the exact orientation of the annular first and second surfaces 23 and 24 can be measured. This method of measurement may be further enhanced by employing a comparator which enlarges the bead cross section and facilitates more accurate measurements. The measurement techniques are known in the art and can lead to very accurate measurement, even of elastomeric composite articles such as tires.

Figure 5A:
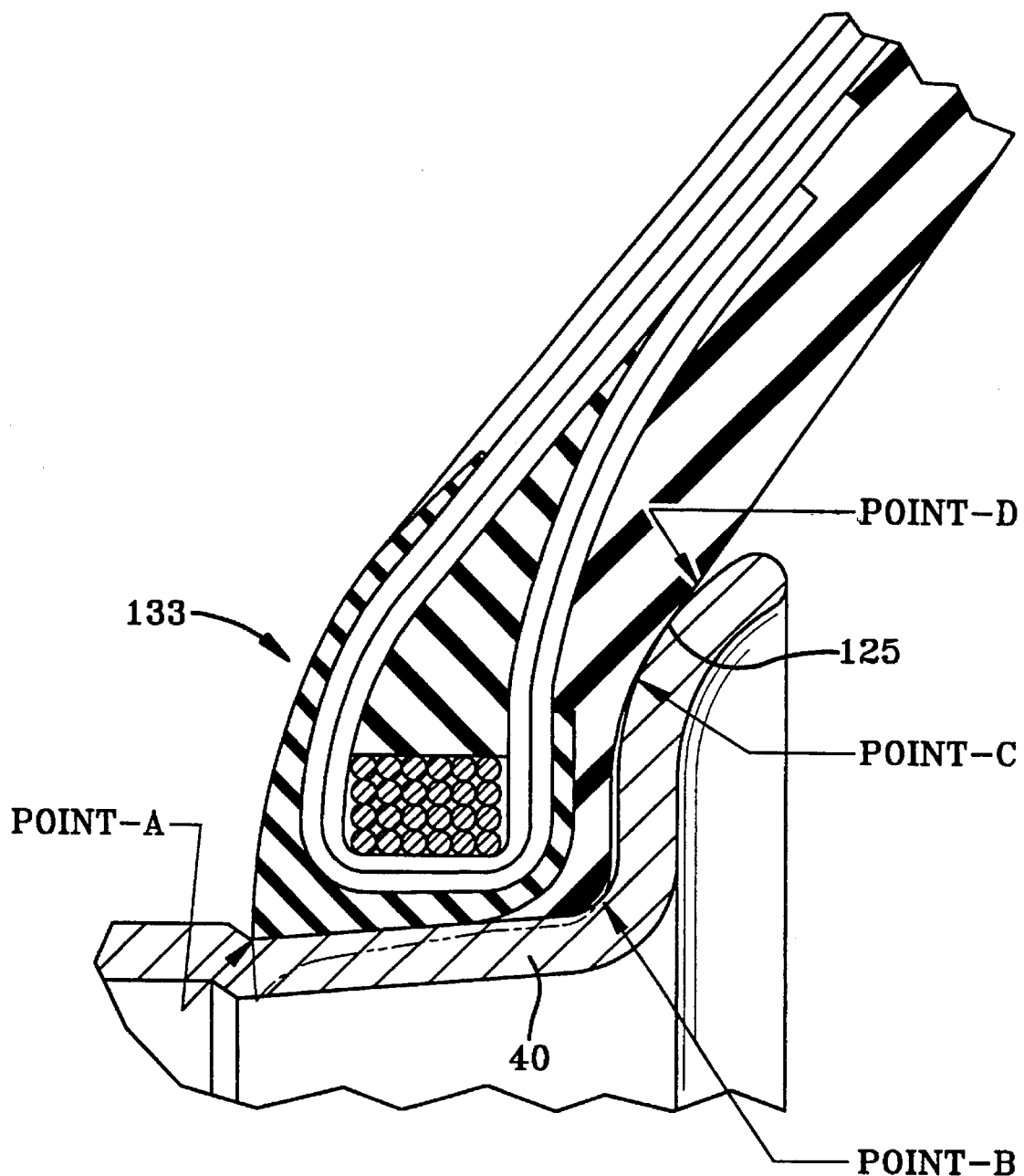
FIG. 5A is an enlarged view of the prior art tire of FIG. 3B as taken along lines 5A of FIG. 5.

In FIG. 5, a prior art tire is shown mounted and inflated on a design rim 40. An enlarged view, FIG. 5A, illustrates the bead and rim fitment. Point A represents the toe of the tire. Point D represents the radially outermost surface of the bead portion in contact with the flange. The annular surface area between Point A and Point D represents the maximum possible rim contacting area available for the prior art tire. As can be seen, the area between Point C and Point B is where the tire bead and the rim are gapped. This means that the adhesion between the rim and the tire is not at 100% of its maximum potential.

Figure 6:
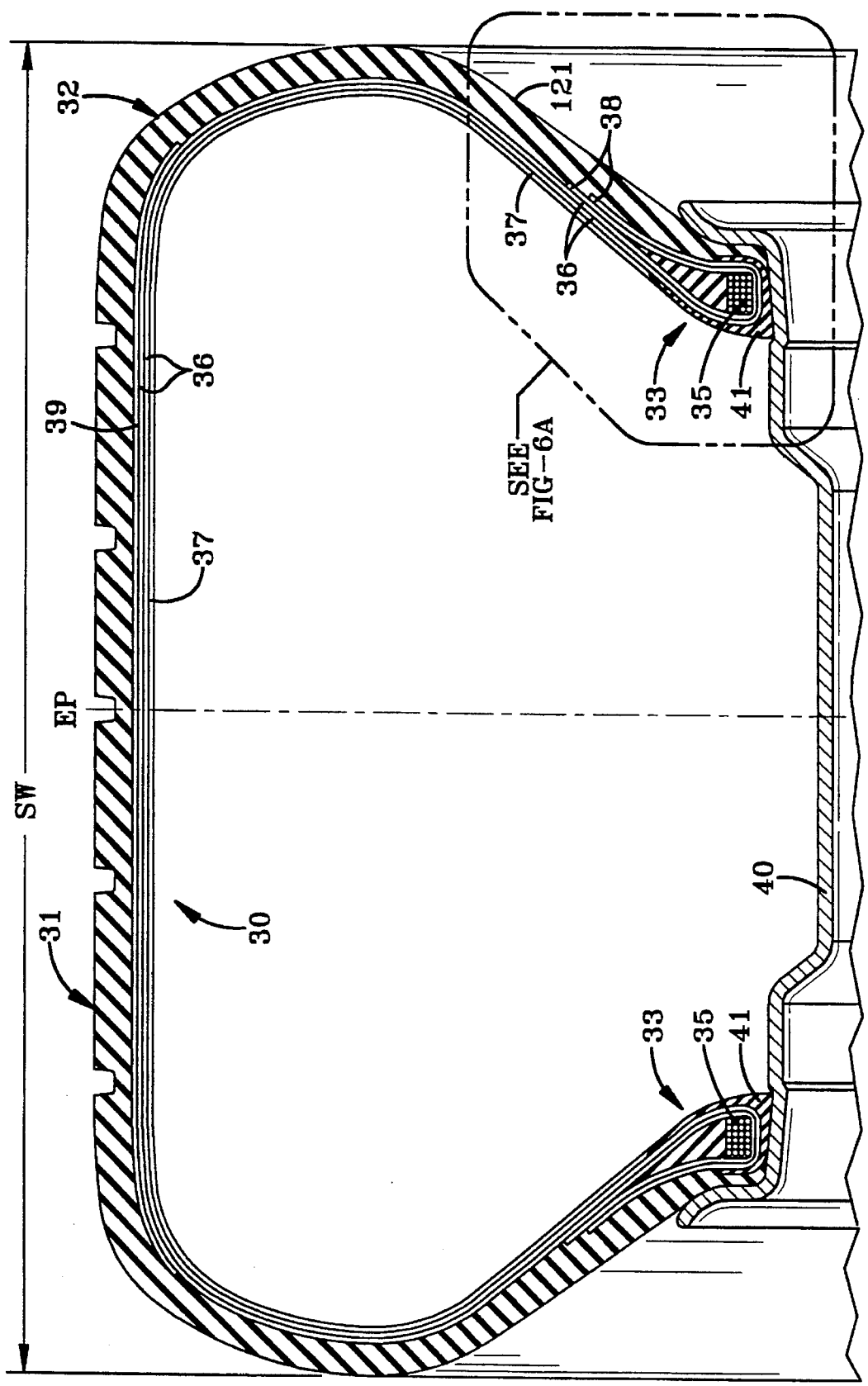
FIG. 6 is a cross sectional view of the tire of FIG. 1 according to the present invention mounted and inflated on a design rim.
Figure 6A:
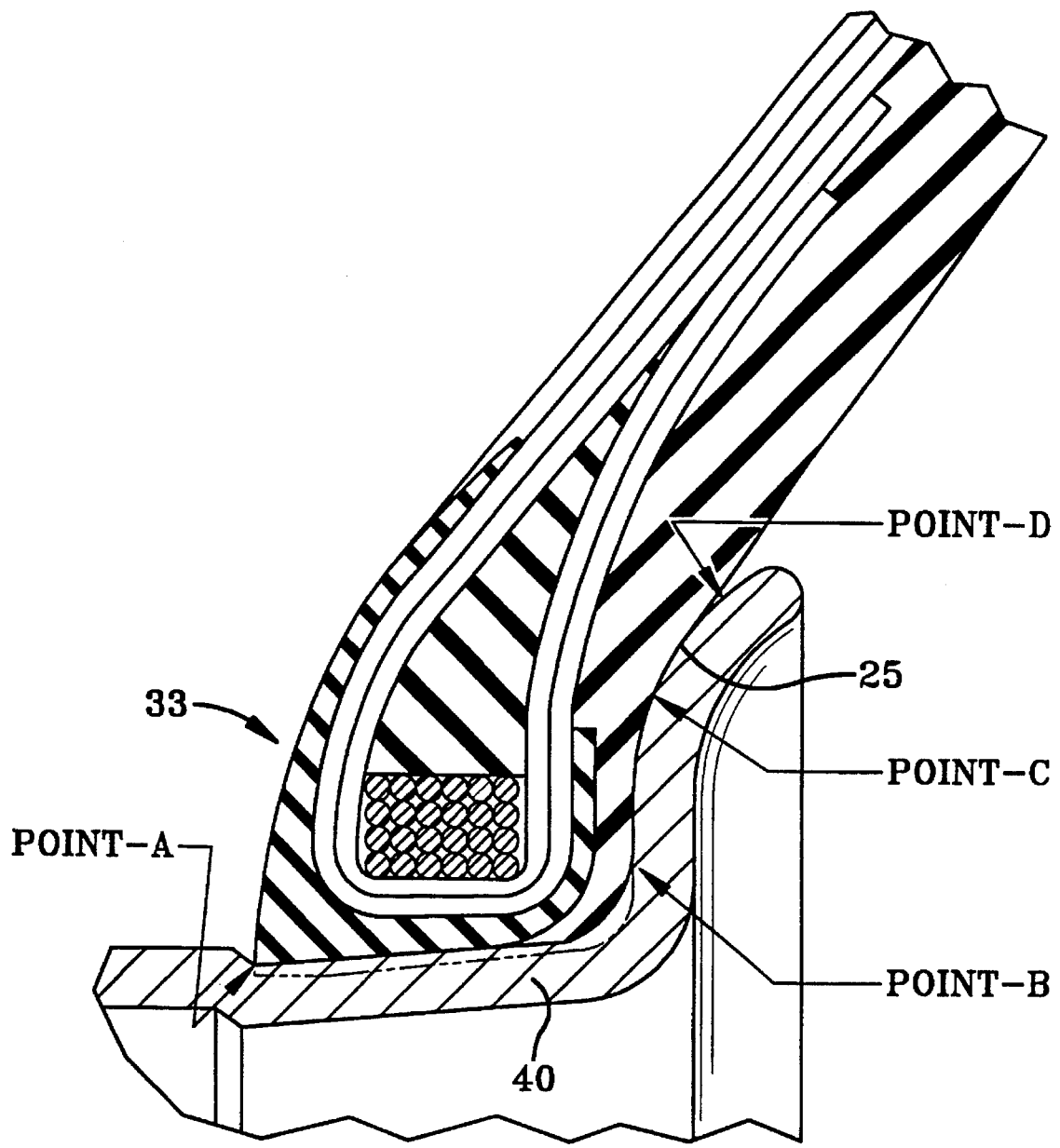
FIG. 6A is an enlarged view of the tire of FIG. 1 as taken along lines 6A of FIG. 6.

FIGS. 6 and 6A are of the tire according to the present invention. The tire fits the rim from Point A to Point D with virtually no gap.

Tires of a given nominal rim diameter must be able to fit rims having a range of rim design widths. A control tire according to the prior art as shown in FIGS. 5 and 5A was made in the 225/55R16 size. The control tire was molded with an 8.0 inch molded bead width. The tire had a 16.14 inch tensile member 35 inside diameter hereinafter referred to as the bead diameter. The sharp diameter was 15.908 inches. Similarly, an experimental tire made according to the present invention was fabricated. The 225/55R16 experimental tire had a 7.25 inch molded design rim width (D) or mold bead width, a 15.923 inch sharp diameter, and a bead diameter of 16.18.

Conventional "J" type rims having a 5° bead seat were mounted with the control tires and experimental tires. The rim widths ranged from 6" to 9" in one inch increments. Tangential X-rays were taken of each tire and rim assembly at two locations 180° apart for each side of the tire. The gap at each of the four locations was measured from the X-ray film and the average amount of gap was then calculated. The results are as shown in FIG. 7. The results as illustrated are the axial space between the second annular surface and the rim flange unless indicated by an "H" which is the gap at the heel radius and the rim heel radius. Although the present invention attempts to eliminate all gaps, gaps at the heel radius are considered acceptable due to the minimal surface area and the inability of the stiff bead to conform into the rim contour over the entire range of rim widths.

As can be readily seen from the table of FIG. 7, the prior art control tire is gapped on rim widths of 6, 7, and 8 inches along the rim flange and is gapped in the heel area on the 9 inch size rim width. Alternatively, the experimental tire made according to the present invention exhibits no rim flange area gapping and only a minor average gap is shown in the bead heel radius area for the 8" and 9" rim widths. The improved fit is believed to be the result of the change in bead shape in combination with the molded bead width change. The increase in the bead diameter and the change in sharp diameter are believed to be of importance to fit but of greater importance to bead seat force and uniformity of compression as will be discussed below.

One factor that is believed to contribute to the poor fit relationship by the prior art control tire 130 and other commercially available tires is that as the rim width differs from the molded bead width, the curved third surface 125 of the bead contacts the curved portion of the rim flange. This is particularly problematic when the rim width is axially smaller than the tire's molded bead width. In that case, the curvature of the third surface 125 is in fact radially lowered contacting the rim flange at the curvature of the flange at a location as shown in FIG. 5A initially at Point C. This axially pushes the entire bead inwardly and creates the gaps as noted in the table of FIG. 7. Alternatively, the present invention has the molded design rim width D selected to minimize the axially inward shift and the bead shape is such that the curved third portion 25 extends from the second surface 24 a distance spaced sufficiently radially outwardly to insure that the radius of curvature of the third surface 25 is at least radially spaced equal to or greater than the radius of curvature of the design rim flanges over the range of recommended widths. Under these dimensional conditions, the curvature cannot push the bead axially inwardly thus creating a gap along the second annular surface as is exhibited in the prior art tires.

Figures 8, 8A:
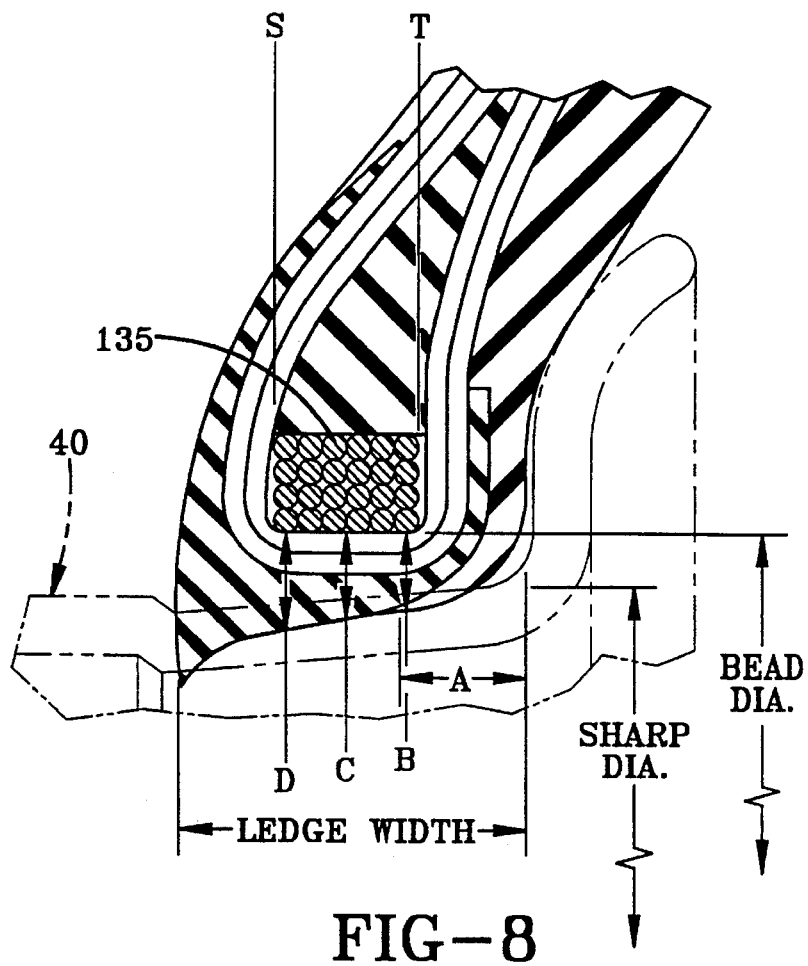
FIG. 8 is an enlarged cross sectional view of the prior art tire bead.
FIG. 8A is a table showing the compression results when the prior art tire is mounted on the design rim.
Figures 9, 9A:
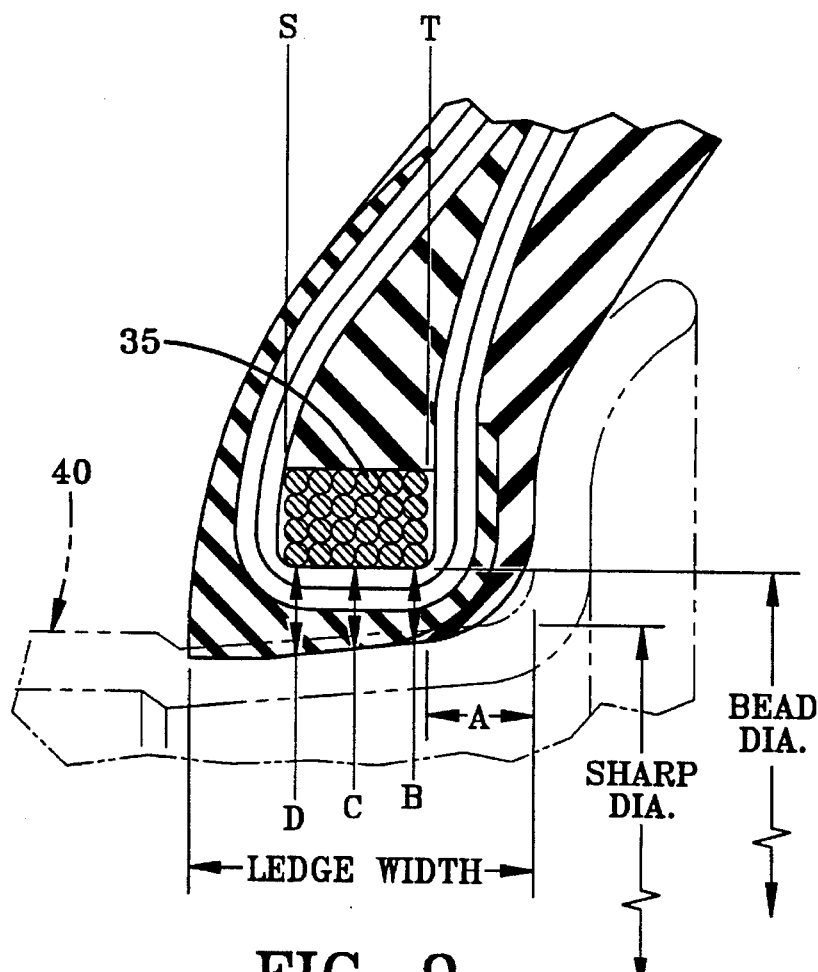
FIG. 9 is an enlarged cross sectional view of the tire bead according to the present invention.
FIG. 9A is a table showing the compression results when the tire of the present invention is mounted on the design rim.

FIGS. 8 and 9 respectively illustrate a portion of the bead 133 of the prior art tire 130 and a portion of a bead 33 of the present invention tire 30 in solid lines with the design rim 40 shown in dashed lines. The bead annular tensile number 35 in both figures has a rectangular cross section. Plane T represents the axially outer portion of the annular tensile member 35 while Plane S represents the axially inner location of the tensile member 35, each plane being tangent to the tensile member's axially inner and axially outer ends and perpendicular to the tire's axis. The bead's annular tensile members 35 are formed from steel filaments annularly wrapped in layers, commonly known in the art as a strap bead. The radially inner surface of the annular tensile member 35 as shown is a horizontal surface parallel to the axis of rotation of the tire. Alternatively, the tensile member could have a hexagonal, square, or other cross sectional shape having a radially inner flat or horizontal surface.

As illustrated in FIGS. 8 and 9, the prior art tire 130 and the tire 30 of the present invention have an interference fit between the design rim bead seat 42 diameter and the bead 33,133 of the tires. The interfering material as illustrated must move or be compressed. The annular tensile member being virtually inextensible means that the material directly radially inward of the member 33 must be compressed.

In FIGS. 8A and 9A, tables of engineering calculations are shown. The prior art tire and the tire of the present invention when designed to fit on a 14" nominal diameter "J" type rim exhibits the dramatic differences in the percentage of material to be compressed.

As shown in table 8A, the prior art tire at locations B, C and D has percentage of material compression of 21.5%, 25.3% and 28.5% respectively. A difference of 7% is exhibited. This percentage difference greatly affects the force required to seat the beads when mounting the tire to the rim. The ideal situation is believed to be exhibited when the percentage compression is constant between the B, C and D locations. The 7% range when divided by the mean percent material compression shows a 28% range variation from high to low.

As shown in FIG. 9A, the tire according to the present invention between planes S and T at locations B, C and D has a generally uniform percentage of material radially compressed of 21.2%, 21.4% and 21.5% respectively. Locations B, C and D are on the radially inner flat surface of the annular tensile member, B being at an axially inner end, D being at an axially outer end and C being interposed between B and D. A difference of only 0.3% is exhibited. This small percentage change will be shown in a later table to dramatically reduce the amount of inflation pressure required to seat the beads upon a rim. Although not an ideal constant percentage compression, the variation of 0.3% across the range when divided by the mean percentage material compression yields less than 1.5% range variation from the high to low. The percentage compression variation between planes S and T is one percent or less from the mean or average compression when the tire 30 is mounted on its design rim. Preferably, the bead percentage of compression is less than 22% between planes S and T.

Figure 10A:
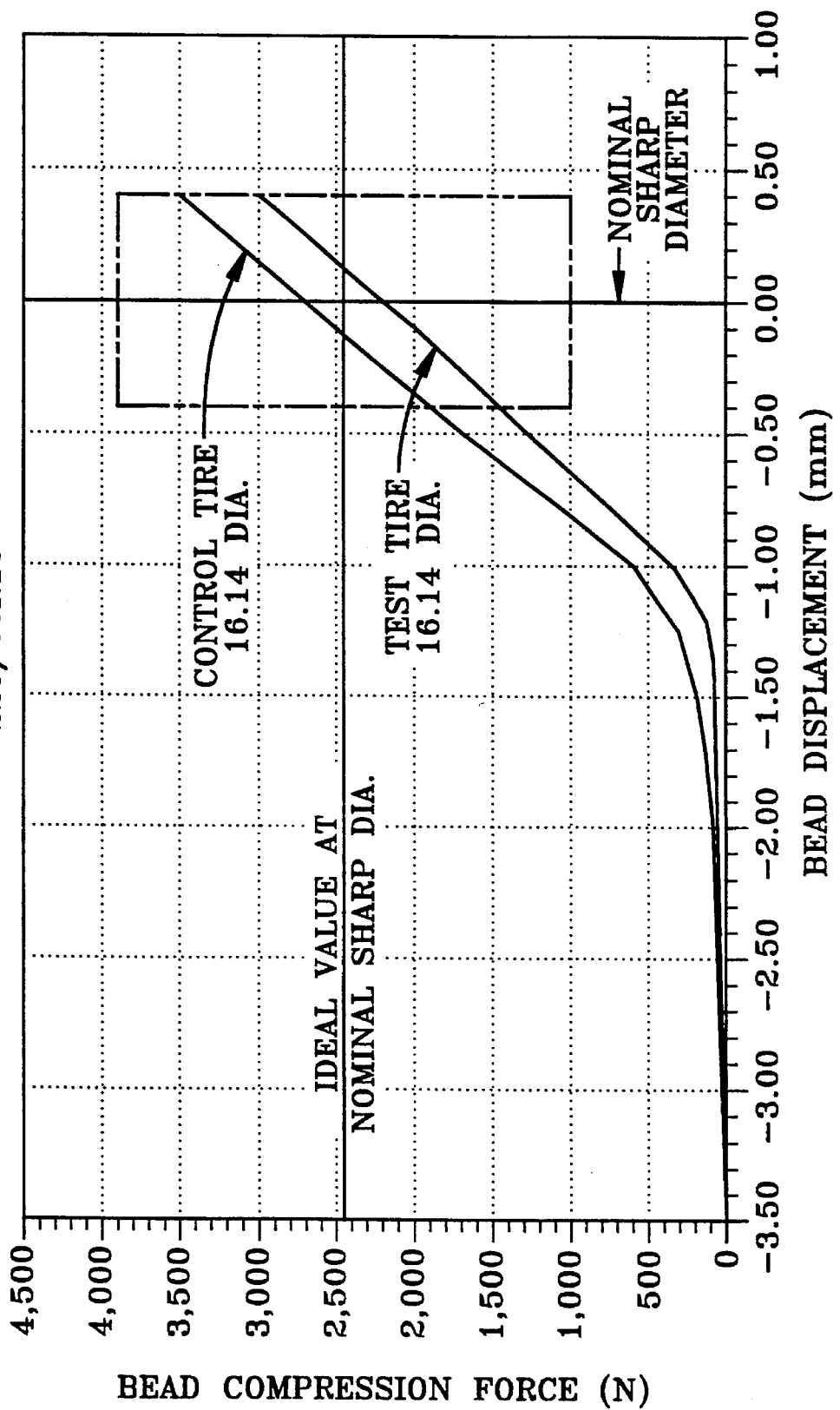
FIG. 10A is a table of the bead compression force (Newtons) as a function of bead displacement at various bead diameters.
Figure 10B:
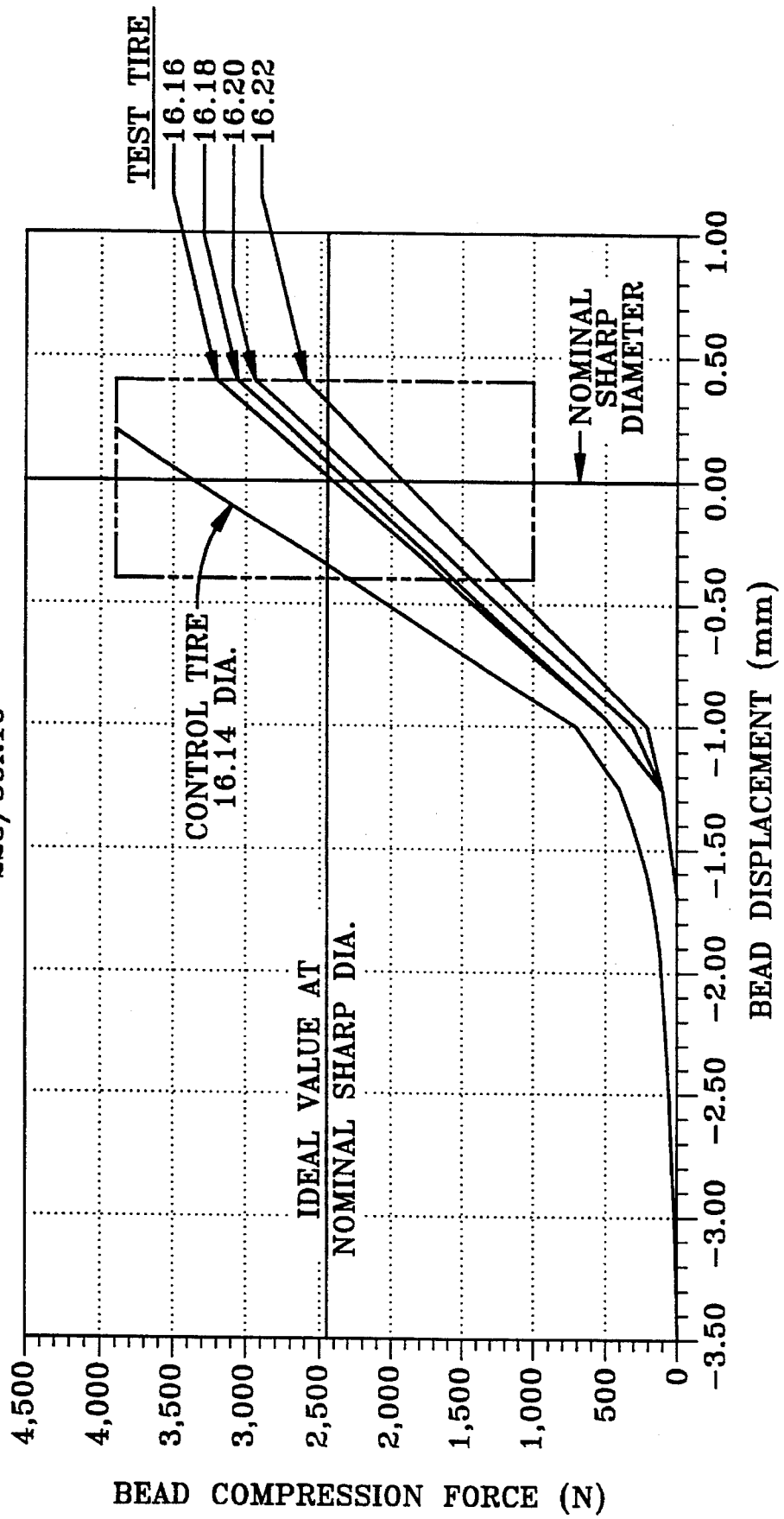
FIG. 10B is a table of the bead compression force (Newtons) as a function of bead displacement at various bead diameters.

The effect of this improved compression uniformity can best be observed in FIGS. 10A and 10B. FIGS. 10A and 10B illustrate graphically the effect of the material compression variation.

In FIG. 10A a 225/60R16 control tire is compared to a 225/60R16 test tire made according to the present invention. Each tire had bead diameters of 16.14 inches. The control tire exceeded the ideal value, whereas the test tire has a shallower slope and is slightly below the ideal value. This means that the force required to seat the beads is lower in the test tire than the control tire.

The control tire ideally should require 2500 Newtons or 550 pounds to seat the beads upon the 16.0" nominal diameter rim. When the prior art 225/55R16 control tire of FIG. 10B has a 16.14 bead diameter and a nominal sharp diameter of 15.908 inches at a point approximately −0.015 inches (0.4 mm), the curve crosses the ideal value. At the nominal sharp diameter, the force required is about 3300 Newtons. The box represented by the dashed lines establishes an acceptable range of force versus bead displacement relative to the nominal sharp diameter. Ideally, the curve should enter and leave the box intersecting the vertical walls.

From FIG. 10B, the curve of the 225/55R16 control tire, one can see that the slope is quite high and that the nominal sharp diameter. Should be increased from 15.908 by 0.015 inches or 0.4 mm. This increase to 15.923 would mean that the ideal force value should be at the new nominal sharp diameter value.

In FIG. 10B, a prior art control tire having a 16.14 inch bead diameter was compared to four test tires made according to the present invention. The curves of the test tire have the nominal sharp diameter increased by the 0.015 inch. Correspondingly, the nominal bead diameters were correspondingly increased in 0.020 of an inch increments from 16.16 to 16.22 inches. Interestingly, the 16.16 diameter 225/55R16 test tire fell precisely on the ideal 2500 Newton force line. The lower 55 aspect ratio tire of FIG. 10B being stiffer than the 60 aspect ratio tire of FIG. 10A explains the slightly higher bead seating of the lower aspect ratio tire. The curves of the 16.16, 16.18 and 16.20 bead diameters were surprisingly closely spaced while the curve for the 16.22 test tire was more widely spaced. The curves of the test tires, when compared to the control tire, each exhibited a shallower slope of forces which is believed to be directly related to the uniform compression under the bead tensile member 35 when the first annular surface 23 is inclined at the preferred angle β of 6.5°.

Of even greater significance, by employing the present invention and shifting the bead diameter to 16.18 inches, a plus or minus 0.020 inch variation of tolerances can be absorbed without significantly changing the bead seat force. This means that the tire made according to the present invention is much less tolerance sensitive when compared to those of the prior art. Preferably the annular tensile member has a radially inner surface having a diameter in the range of 0.14 to 0.22 inches (3.5 mm to 5.6 mm) greater than the nominal diameter of the rim for which the tire is intended to be mounted.

Naturally, one of ordinary skill in the art would suspect the increase in bead diameter to result in lower forces to seat the beads onto the rim when mounting the tire. However, a corresponding effect of a reduced tire to rim adhesion would be expected. Historically, the tire engineer has opted for increasing interference between the tire and rim to maximize adhesion as evidenced by the prior art tires. The present invention relies more on uniform compression and maximizes the rim to tire bead surface contact and adhesion.

FIG. 11 shows that the 225/55R16 prior art tire 130 requires between 39 and 45 psi to seat the beads upon mounting. The present invention tire requires 24 to 25 psi to similarly seat the beads. The tires were then tested for rim slip under breaking and acceleration tests which will be further discussed. Neither the prior art tire nor the tire of the present invention exhibited rim slip.

Tire/rim slippage is more severe when certain lubricants are used to seat the beads. FIG. 13 is a table wherein tires of the P225/60R16 size were evaluated using the prior art bead shape of FIG. 3 versus the bead shape of the present invention. In this test, the bead diameters of both the control tire and the test tire were identical, 16.14 inch diameters. The total amount of tire-to-rim slippage under wide open throttle acceleration from a stopped position as well as breaking slip was tested. The results measured in inches of slip are the total slip observed in three successive runs. The tire and rim were each marked and the circumferential distance between the marks was measured after the tests. The position relative to the vehicle is indicated, RR meaning right rear, RF meaning right front. In acceleration tests, the rear tires were much more prone to slippage as would be expected of a rear wheel drive vehicle. The experimental tire was substantially better than the control tire in the rear wheel position. In breaking slip the front tires exhibited the worst slippage. Again the experimental tire had less slippage. The overall results indicated that in the worst case for each tire, the experimental tire exhibited at least 20 times less slippage, implying greatly improved adhesion of the tire to the rim.

Having improved the adhesion while at the same time reducing the bead seating force, the experimental tire bead shape has achieved an improvement in what is generally considered to be conflicting design constraints.

In FIG. 12, a table is shown of the results from bead durability tests. The control tire of the prior art and the experimental tire according to the present invention were tested under exaggerated and extreme testing conditions. The tire according to the present invention achieved approximately a 250% improvement in durability. The control tire initiated ply ending separation at the 8,500 to 10,000 mile range, whereas the experimental tire initiated ply end separation in the 20,000 to 25,000 mile range. Although initiation of ply end separation is not a problem over the life of a tire under normal use conditions, the test is indicative that the stresses seen are much less in the design of the present invention.

As shown in the FIGS. 1, 4, 6, 6A and 9, the tire according to the present invention is shown with a first annular surface that includes a surface adjacent the bead toe 22A, the surface extending from the toe axially a short distance and being parallel to the axis of rotation. This feature of the preferred embodiment tire is believed to improve the durability of the bead toe 22A.

Additionally, it has been determined that the bead heel 22B can include a chamfered surface truncating the curved heel 22B.

What is claimed:

1. An improved radial-ply pneumatic tire having an axis or rotation, and a pair of axially-spaced beads respectively including annular tensile members, each annular tensile member having a radially inner flat surface prior to the tire being molded, and at least one radial ply extending between the annular tensile members of the respective beads, the beads each having a heel portion and a toe portion designed to engage a design rim having a bead seat and a design rim width D, the width D being defined as half of the quantity equal to the maximum recommended rim width plus the minimum recommended rim width, such rim widths being as specified by the industry standards in effect in the location in which the tire is manufactured, the improved tire being characterized by a first annular surface between the heel and toe of each bead and a second annular surface extending radially outwardly from each bead heel, the first annular surface being in contact with the bead seat of the design rim when the tire is mounted and inflated to normal pressure, the first annular surface, when the tire is unmounted, forming, with the axis of the tire, when the beads am axially spaced a distance equal to the design tire width D, an average angle $\beta$, that is in the range of one-half degree to less than three degrees greater than the angle formed between the mating bead seat of the design rim and the axis of the tire, and the second annular surface when the tire is unmounted is inclined at an angle a that is in the range of 0° to less than 3° relative to a plane P, the plane P being perpendicular to the axis of rotation, the second annular surface being in contact with an annular flange portion of the design rim when the tire is mounted and inflated to normal pressure and wherein the bead is generally uniformly radially compressed between the first annular surface and the annular tensile member as measured between an axially inner and an axially outer end of the radially inner flat surface of the annular tensile member, the compression being measured as a percentage of radial compression when the tire is mounted to its design rim.

2. The improved radial-ply pneumatic tire of claim 1 wherein a portion of the first annular surface, when the tire beads are at the design rim width D, is located between a plane C, perpendicular to the axis of the tire and passing through the center of the annular tensile member, and a plane T, plane T being tangent to the axially outer side of the annular tensile member and perpendicular to the axis of rotation of the tire.

3. The improved radial ply pneumatic tire of claim 1 wherein the angle $\beta$ is in the range of 5°30' to less than 8° relative to a line parallel to the axis of rotation.

4. The improved radial ply pneumatic tire of claim 3 wherein the angle $\beta$ of the first surface is about 1.5° greater than the angle formed between the mating bead seat of the design rim and a line parallel to the axis of the tire.

5. The improved radial ply pneumatic tire of claim 2 wherein the angle $\alpha$ is in the range of 0° to 1.5° relative to the plane P, plane P being perpendicular to the axis of rotation.

6. The improved radial ply pneumatic tire of claim 2 wherein a portion of the first annular surface, when the tire beads are at the design rim width D, is located between a plane S, plane S being tangent to the axially inner side of the annular tensile member and perpendicular to the axis of rotation of the tire and the plane T, plane T being tangent to the axially outer side of the annular tensile member and perpendicular to the axis of rotation of the tire.

7. The improved radial ply pneumatic tire of claim 1 is further characterized by a third annular surface, the third annular surface being an extension of the second annular surface, the third surface having a single radius of curvature R equal to or greater than the radius of curvature of the design rim flange and located radially tangent or outward of the rim flange when the tire is mounted onto the design rim and inflated to normal pressure.

8. The improved radial ply pneumatic tire of claim 3 wherein the tensile member has a cross section of rectangular shape.

9. The improved radial ply pneumatic tire of claim 2 wherein the tensile member has a cross section of hexagonal shape.

10. The improved radial ply pneumatic tire of claim 2 wherein the bead heel has a single radius of curvature and intersects the first annular surface axially outward of the plane T, plane T being tangent to the axially outer side of the annular tensile member and perpendicular to the axis of rotation of the tire.

11. The improved radial ply pneumatic tire of claim 1 wherein the annular tensile member radially inner flat surface has a diameter in the range of 0.14 to 0.22 inches (3.5 mm to 5.6 mm) greater than the nominal rim diameter of the rim for which the tire is intended to be mounted.

12. The improved radial ply tire of claim 11 wherein the bead between the first annular surface and the annular tensile member must be diametrically compressed radially between the planes S and T, plane S being tangent to the axially inner side and plane T being tangent to the axially outer side of the annular tensile member, both planes S and T being perpendicular to the axis of rotation of the tire.

13. The improved radial ply pneumatic tire of claim 1 wherein the bead percentage of compression is less than 22% as measured between the axially inner and axially outer ends of the radially inner flat surface of the annular tensile member between planes S and T, plane S being tangent to the axially inner side and plane T being tangent to the axially outer side of the annular tensile member, both planes S and T being perpendicular to the axis of rotation of the tire.

* * * * *